(12) United States Patent
Komachiya et al.

(10) Patent No.: US 6,571,314 B1
(45) Date of Patent: May 27, 2003

(54) METHOD FOR CHANGING RAID-LEVEL IN DISK ARRAY SUBSYSTEM

(75) Inventors: Tsunetaka Komachiya, Hachioji; Yoshihisa Kamo, Musashimurayama; Akira Yamamoto, Sagamihara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/254,956
(22) PCT Filed: Sep. 20, 1996
(86) PCT No.: PCT/JP96/02718
§ 371 (c)(1), (2), (4) Date: Mar. 22, 1999
(87) PCT Pub. No.: WO98/12621
PCT Pub. Date: Mar. 26, 1998
(51) Int. Cl.⁷ .............................................. G06F 12/00
(52) U.S. Cl. ...................................................... 711/114
(58) Field of Search .......................................... 711/114

(56) References Cited

U.S. PATENT DOCUMENTS

| 5,479,653 A | 12/1995 | Jones | 714/5 |
| 5,664,187 A | * | 9/1997 | Burkes et al. | 707/205 |
| 5,960,169 A | * | 9/1999 | Styczinski | 711/114 |

FOREIGN PATENT DOCUMENTS

EP 0726514 8/1996

* cited by examiner

Primary Examiner—David L. Robertson
(74) Attorney, Agent, or Firm—Antonelli, Terry, Stout & Kraus, LLP

(57) ABSTRACT

In a disk array subsystem capable of changing the data redundancy method between a duplicating method and a parity method, the load of data transfer occurring at the time of changing the data redundant method is reduced. In the disk array subsystem, since one data of the duplicated data are used for data for the parity data area, the one data secures an area for storing parity prepared from the data. With the arrangement, it is not necessary to transfer the data when the data redundancy method is changed from the duplicating to the parity method and the data transfer load is mitigated.

22 Claims, 9 Drawing Sheets

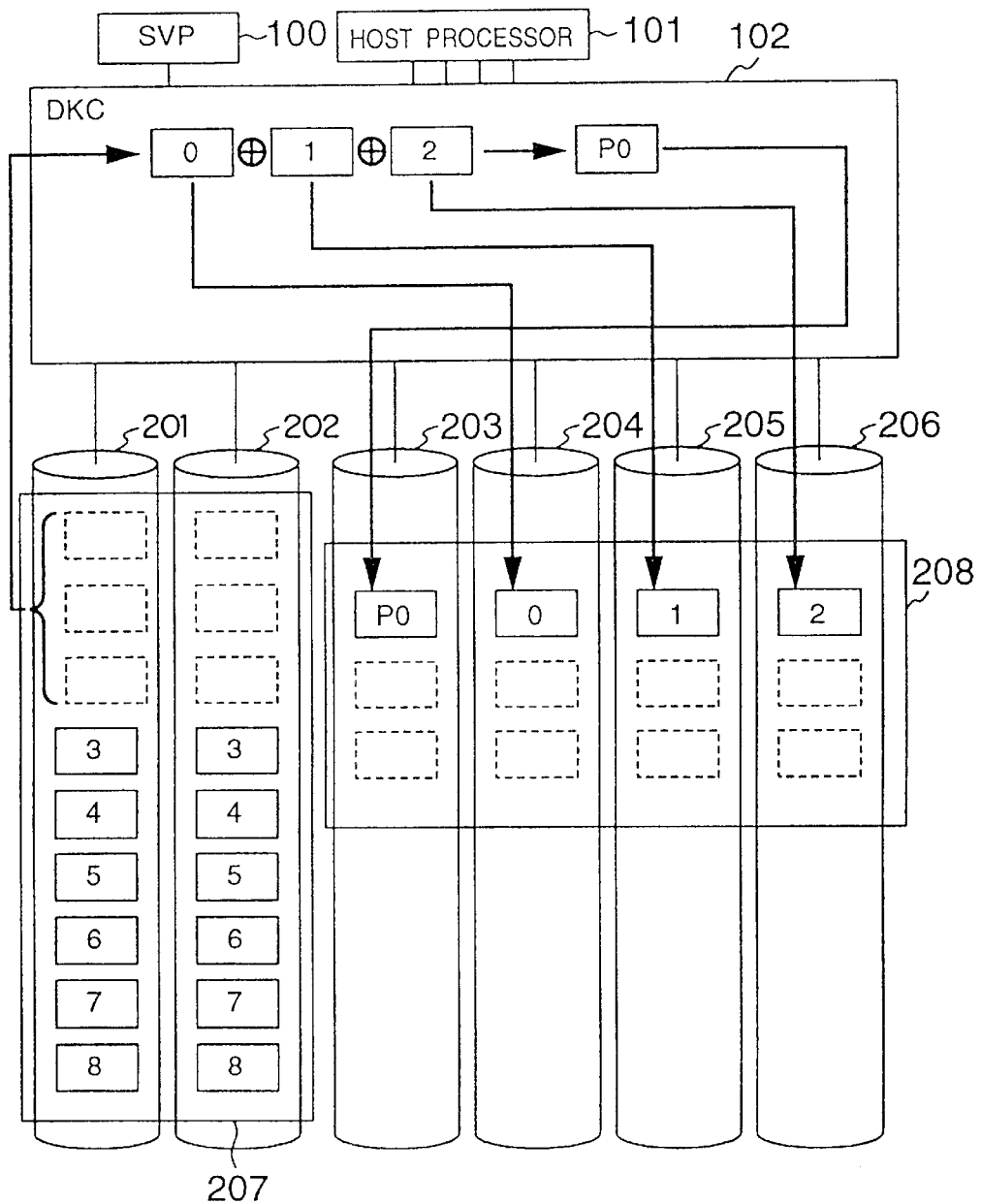

METHOD FOR CHANGING RAID-LEVEL IN DISK ARRAY SUBSYSTEM

TECHNICAL FIELD

The present invention relates to a storage subsystem, and more particularly to a disk array subsystem for performing a redundancy method and storing data.

BACKGROUND ART

Two method for storing redundant data in a storage subsystem are typically known. One is a mirror method for duplicating data. The other is a parity method in which parity data are generated from data.

Methods for storing redundant data in a disk array subsystem are illustrated in detail in literature: A Case for Redundant Arrays of Inexpensive Disks (RAID), 15 David A. Patterson, Garth Gibson, and Randy H. Katz, 1988 ACM 0-89791-268-3/88/0006/0109.

Advantages and disadvantages in using the mirror and parity methods in a disk array subsystem will be described below.

In storing redundant data by a mirror-based redundancy process, the data is duplicated by storing the same data in two different drives within the disk array subsystem. In storing redundant data by a parity-based redundancy process, parity data generated from the data are stored in a drive different from a drive in which the original data are stored (the parity data uses a smaller capacity than the original data). The mirror method provides better performance and availability, but is not an efficient use of capacity and is more expensive than the parity method. The parity method is less expensive, but is more disadvantageous in terms of performance and availability than the mirror method.

JP-A-7-84732 discloses a subsystem where both mirror-based storing of redundant data and parity-based storing of redundant data are present. JP-A-7-84732 also discloses techniques by which the subsystem can dynamically change the redundancy methods from mirror to parity and vice versa for its data. The redundancy method changing techniques allow users to store data in the subsystem with the best redundancy method selected in terms of trade-offs between cost, performance and availability.

The technique disclosed in JP-A-7-84732 requires that to change the data redundancy methods, data be transferred between data areas in which the data are stored by the different redundancy methods. FIG. 9 shows a process by which the disk array subsystem changes the redundancy method from mirror to parity. A disk array controller 102 (hereinafter referred to as "DKC") transfers data from a mirror-based data storing area 207 to a parity-based data storing area 208. In the example shown in FIG. 9, transfer of data blocks 0, 1 and 2 requires that a single reading operation and four writing operations be effected with respect to magnetic disk drives (hereinafter referred to as the "drive(s)") including the generation and writing of parity data. Further, the data transfer occupies five drives 201, 203, 204, 205 and 206. As a result, the performance of the disk array subsystem is significantly impaired. To change the redundancy methods from parity to mirror, data stored by the parity method is first read and the read data is thereafter duplicated for mirror-based storing of redundant data and then is written. As a result, the performance of the subsystem is similarly impaired.

SUMMARY OF THE INVENTION

The object of the present invention is to allow a disk array subsystem capable of changing the redundancy method to reduce its loads caused by data transfer occurring when the redundancy method is changed.

A disk array subsystem according to the present invention has a plurality of drives for storing blocks of data supplied from a host apparatus, and a disk array controller for setting a plurality of storage areas each extending over the plurality of drives and for controlling the plurality of drives, and when the subsystem duplexes the blocks of data to record them in two of the storage areas, at least one of the two storage areas has data areas for storing the blocks of data included in the plurality of drives and a parity storing area for storing parity data prepared from the blocks of data included in at least one drive.

That is, the disk array subsystem according to the present invention is such that when the subsystem stores redundant data by duplicating, an area for storing parity data (hereinafter referred to as "parity storing area(s)") prepared from the data to be stored is secured in at least one of the storage areas. No parity data have to be actually generated and stored in the parity storing areas as long as the data are duplicated.

To change the redundancy method from mirror to parity, the disk array subsystem according to the present invention reads one group of duplicated data, generates parity data from the read data and stores the generated parity data in the secured parity storing areas. Thereafter, of the storage areas in which the duplicated data are stored, the subsystem deletes the storage area storing no parity data. The other storage area can be treated as a storage area having parity-based redundant data by writing parity data therein.

Thus, according to the present invention, the redundancy method can be changed from mirror to parity only by reading data, generating parity data and writing the generated parity data. As a result, the present invention can dispense with the conventionally required steps of reading one group of duplicated data, generating parity data from the read data and writing both the read data and the generated parity data.

On the other hand, to change the redundancy method from parity to duplicating, the disk array sub-system of the present invention copies data stored in one storage area that has both data areas for storing the data and parity storing areas for storing parity data generated from the data into the other storage area to thereby duplicate the data both in the source storage area and in the copied-data storage area.

To change the redundancy method from parity to duplicating, the conventional disk array subsystem first read parity-based redundant data and thereafter duplicated the read data, and thus the duplicated data had to be written in two places. However, in the present invention a storage area having both data and parity data generated from such data is used as one of the duplicated storage areas. Therefore, there is no need to write the data in the two storage areas for duplicating. That is, the present invention can change the redundancy method only by writing the data in one storage area.

BRIEF DESCRIPTION OF DRAWINGS

FIG. 9 is a diagram showing a process for changing redundancy method from mirror to parity in a conventional disk array subsystem.

DETAILED DESCRIPTION OF THE INVENTION

Figure 2:
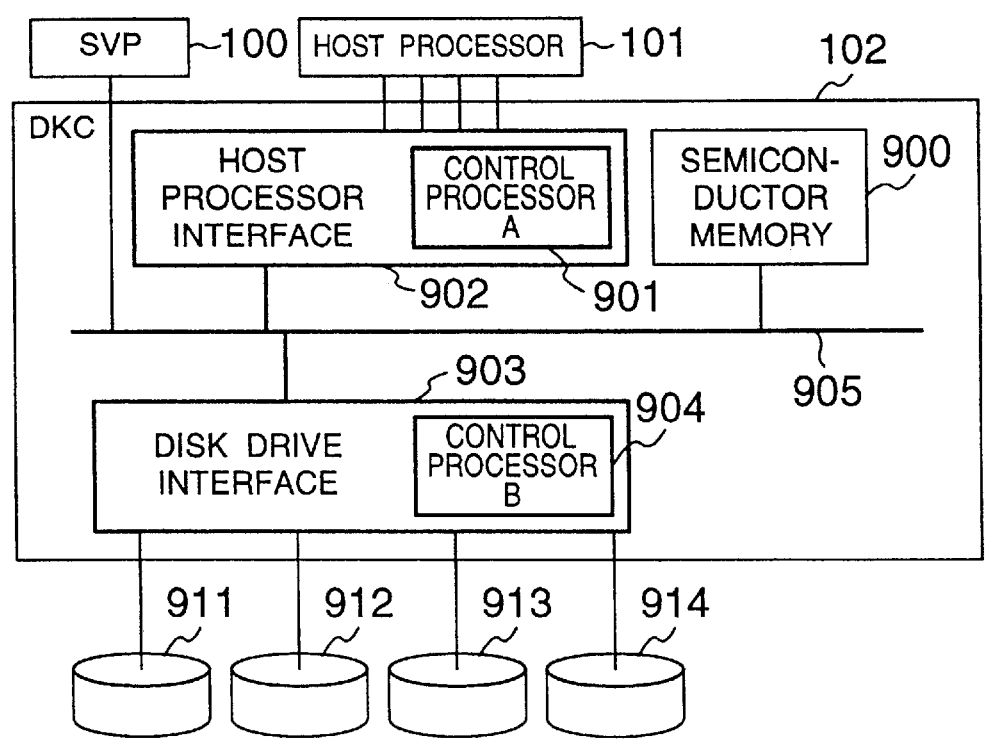
FIG. 2 is a diagram showing a configuration of a disk array controller according to the present invention.

FIG. 2 shows a configuration of a disk array controller according to the present invention. In the disk array controller, an SVP (service processor) 100, a host processor interface 902, a disk drive interface 903 and a semiconductor memory 900 are connected to a common bus 905. The host processor interface 902 is connected to a host processor 101, and the disk drive interface 903 to disk drives 911 to 914.

The host processor interface 902, which is controlled by a control processor A 901, controls data transfer between the host processor 101 and the semiconductor memory 900. The host processor interface 902 transfers data stored on the semiconductor memory 900 to the host processor 101 at a read request made by the host processor. Further, if the semiconductor memory 900 does not have the data for which the read request has been made by the host processor, then the host processor interface 902 instructs the disk drive interface 903 to transfer the data in the disk drives 911 to 914 to the semiconductor memory. On the other hand, the host processor interface 902 stores the data transferred from the host processor 101 on the semiconductor memory 900 at a write request made by the host processor 101, and informs the disk drive interface 903 that the data has been updated.

The disk drive interface 903, which is controlled by a control processor B 904, controls data transfer between the disk drives 911 to 914 and the semiconductor memory 900. The disk drive interface generates parity data from the data in the semiconductor memory as necessary, and stores the generated parity data in the semiconductor memory 900. The disk drive interface 903 transfers the parity data in the semiconductor memory to the disk drives 911 to 914 as necessary.

A maintenance person causes the SVP to check the internal states of the host processor interface 902, the disk drive interface 903 and the semiconductor memory 900 through the common bus 905, and can therefore instruct the control processors A 901 and B 904 to, e.g., recover the faults and configuration changes of the DKC 102 and the drives 911 to 914.

Figure 1:
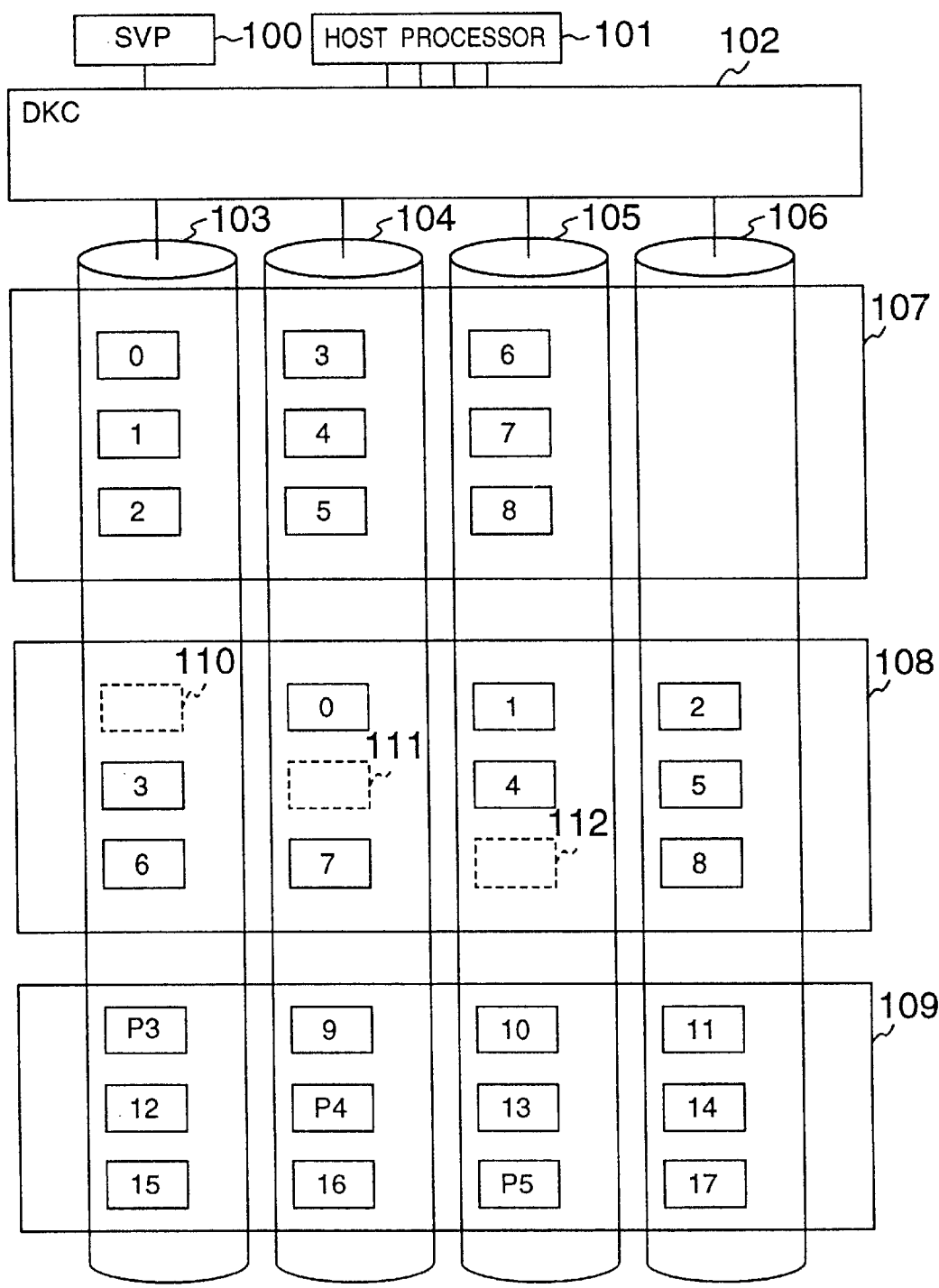
FIG. 1 is a diagram showing data arrangement according to a first embodiment of the present invention.

FIG. 1 shows a disk array subsystem according to a first embodiment of the present invention. In general, disk array subsystems use magnetic disks as their storage media, but can also use magnetic tapes, semiconductor memories and the like. The disk array subsystem according to the first embodiment uses magnetic disk drives.

Magnetic disk drives 103 to 106 are connected to the DKC 102. The DXC 102 is connected to the host processor 101, and controls data transfer between the host processor 101 and the drives 103 to 106. The service processor 100 (SVP) is connected to the DXC 102. A maintenance person performs maintenance work such as failure diagnoses and configuration changes of the DKC 102 and the drives 103 to 106 through the SVP 100.

The storage area of each of the magnetic disk drives 103 to 106 is divided into a mirror data area 107, and a parity data area A 108 and a parity data area B 109.

Data blocks 0 to 17 and parity blocks P3 to P5 in the respective areas are of the same size, and they are contiguous data area within a single drive. In this embodiment, the size of each data block or parity block is equal to the volume of a single track of each drive, and a single block corresponds to a single track.

Data to be formed mirror based redundant data in the disk array subsystem are stored in the mirror data area 107 and the parity data area A 108 or B 109 to be duplicated. The data in the mirror data area 107 are arranged in the same placement as the conventional mirror-based redundant data. Mirror-based data redundancy methods in which the same data is stored in two areas are called "RAID1." The data within the parity data area A 108 or B 109 are arranged in the same placement as the conventional parity-based redundant data. The parity-based data redundancy methods are available as RAID3, RAID4 and RAID5. The method called "RAID5" is used in this embodiment. Note however that if the mirror data area has a copy of the data stored in a parity data area, no parity data to be stored in the parity data area are generated, so that no parity data are written in the parity storing areas.

In the case shown in FIG. 1, the data blocks 0 to 8 are stored in the mirror data area 107 and the parity data area A 108. As a result, no parity data are generated in the parity data area A 108, and no parity data are therefore written to the parity storing areas 110, 111 and 112. On the other hand, no data are duplicated for the parity data area B 109 unlike for the parity data area A 108. Therefore, parity data are generated and stored in the parity data area B 109 as in the conventional method to make the data redundant.

In the state shown in FIG. 1, the data in the parity data area A 108 have been duplicated, and thus superior to the data in the area B 109 in terms of their accessibility, and their availability at the time of a fault. However, in terms of capacity efficiency, the parity data area B 109 is superior to the parity data area A 108, and thus the area B 109 is superior in terms of cost.

The data redundancy method shown in FIG. 1 is particularly advantageous when the data in the parity data area A 108 are used frequently or when serious damage can be caused at the time of a data loss. When the data in the parity data area A 108 are used less frequently or when the importance of such data is reduced, the redundancy method is changed to parity so that the capacity efficiency can be improved.

Figure 3:
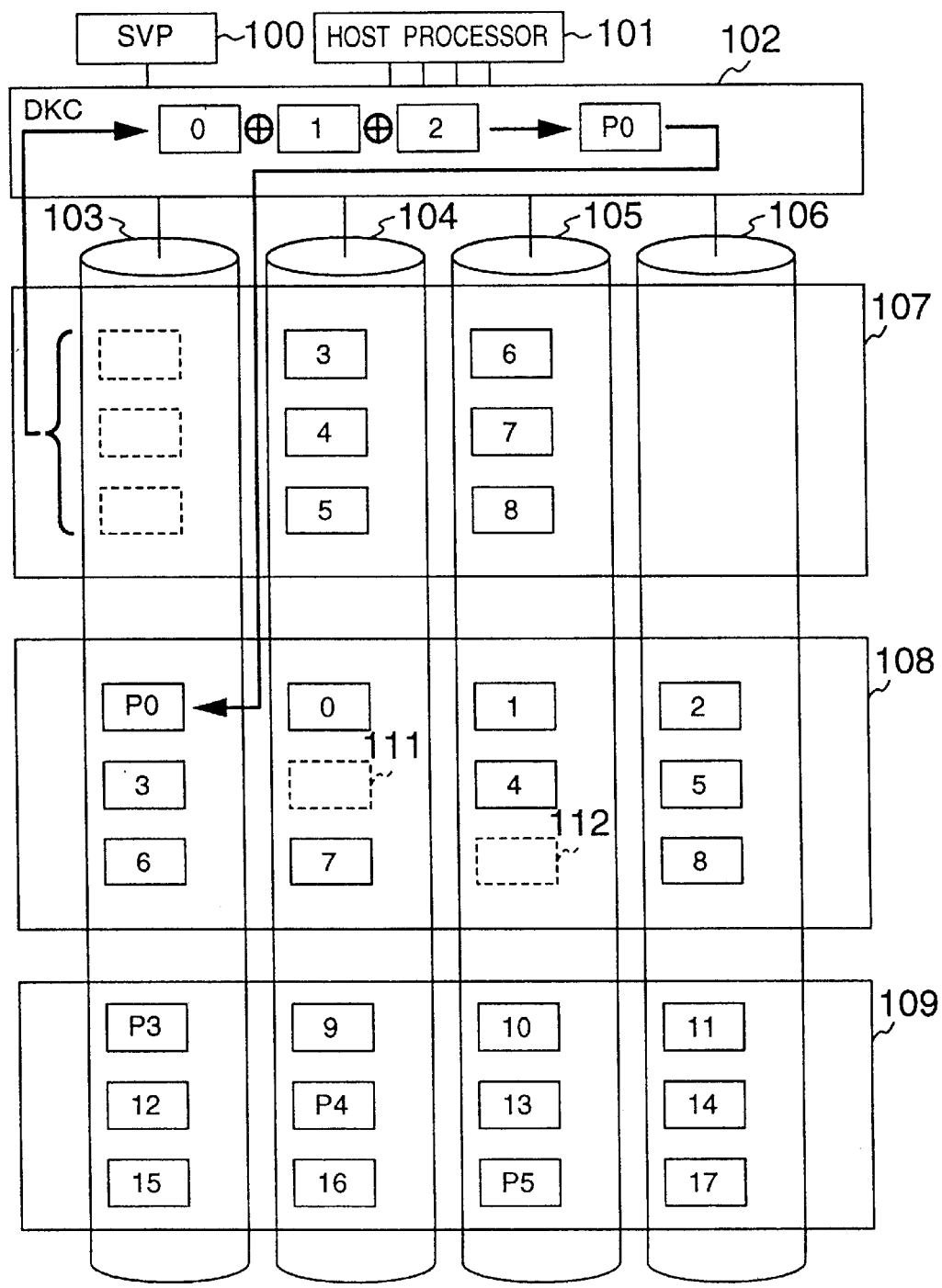
FIG. 3 is a diagram showing a process for changing redundancy method from mirror to parity in a disk array subsystem according to the present invention.

FIG. 3 shows a process by which the DKC 102 changes the redundancy technique to improve the capacity efficiency of the parity data area A 108. First, the DXC 102 reads data from the mirror data area 107, and then generates parity data and writes the generated parity data into parity storing areas of the parity data area A 108. To complete the process, the DKC 102 invalidates the mirror data area 107 so that the invalidated area can store other data. FIG. 3 shows an example in which the DXC 102 generates and writes parity data into the drive 103.

In the first step, the DKC 102 reads the data blocks 0, 1 and 2 from the mirror data area 107 of the drive 103.

In the second step, the DXC 102 EXCLUSIVE-ORs the read data to generate the parity block P0.

In the third step, the DXC 102 writes the parity block P0 into the parity storing area within the parity data area A 108 of the drive 103.

In the fourth step, the DKC 102 invalidates the data blocks 0, 1 and 2 within the mirror data area 107 of the drive 103.

Figure 4:
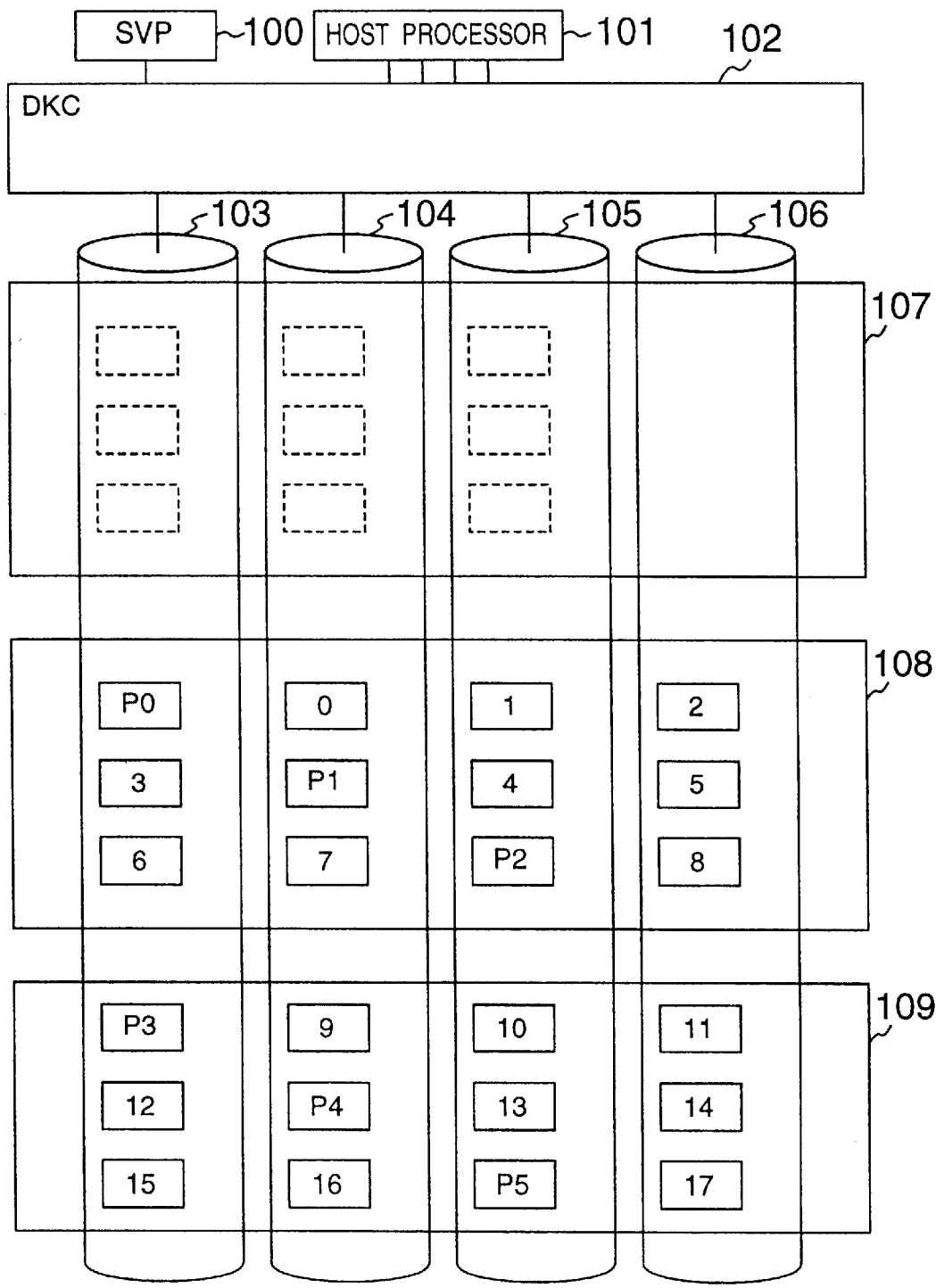
FIG. 4 is a diagram showing data arrangement after change of the redundancy method from mirror to parity has been completed in a disk array subsystem according to the present invention.

The DKC 102 repeats the first to fourth steps for the rest of the drives 104, 105 and 106 to Write parity data in the parity storing areas of their parity data areas A 108, so that all the data blocks within the mirror data area 107 are invalidated. As a result, the redundancy method for the data in the parity data area A 108 is changed to parity-based redundancy method (RAID5 in this embodiment). FIG. 4 shows data arrangement in the disk array subsystem after the change. To change the redundancy method from mirror (RAID1) to parity (RAID5), it is heretofore required that the DKC 102 copy the data blocks into the parity data area after the second step. However, the present invention dispenses with such copying operation by transferring one group of the groups of duplicated data to the parity data area.

Further, the data blocks 0, 1 and 2 necessary for generating the parity data to be stored in the parity storing area P0 are present in the same drive 103 as the parity storing subarea P0. Therefore, the user uses only a single drive to perform a series of process steps including data reading, and parity data generation and writing. Hence, unlike the conventional disk array subsystem shown in FIG. 9 that required that five drives be used and that a one time of reading and four times of writing be carried out to change the redundancy method from mirror to parity, the disk array subsystem according to the present invention requires only a single drive be used and that a single time of reading and a single time of writing be carried out to change the redundancy method from mirror to parity as shown in FIG. 3. Therefore, the present invention can reduce the rate of use of the drives during the changing of the data redundancy method and thus prevent impairment of the performance of the disk array subsystem.

In the disk array subsystem shown in FIG. 4, let us assume that data in the parity data area B 109 are used more frequently or that the importance of the data is increased. In this case, data accessibility and data availability at the time of a fault can be improved by duplicating the data in the parity data area B 109.

Figure 5:
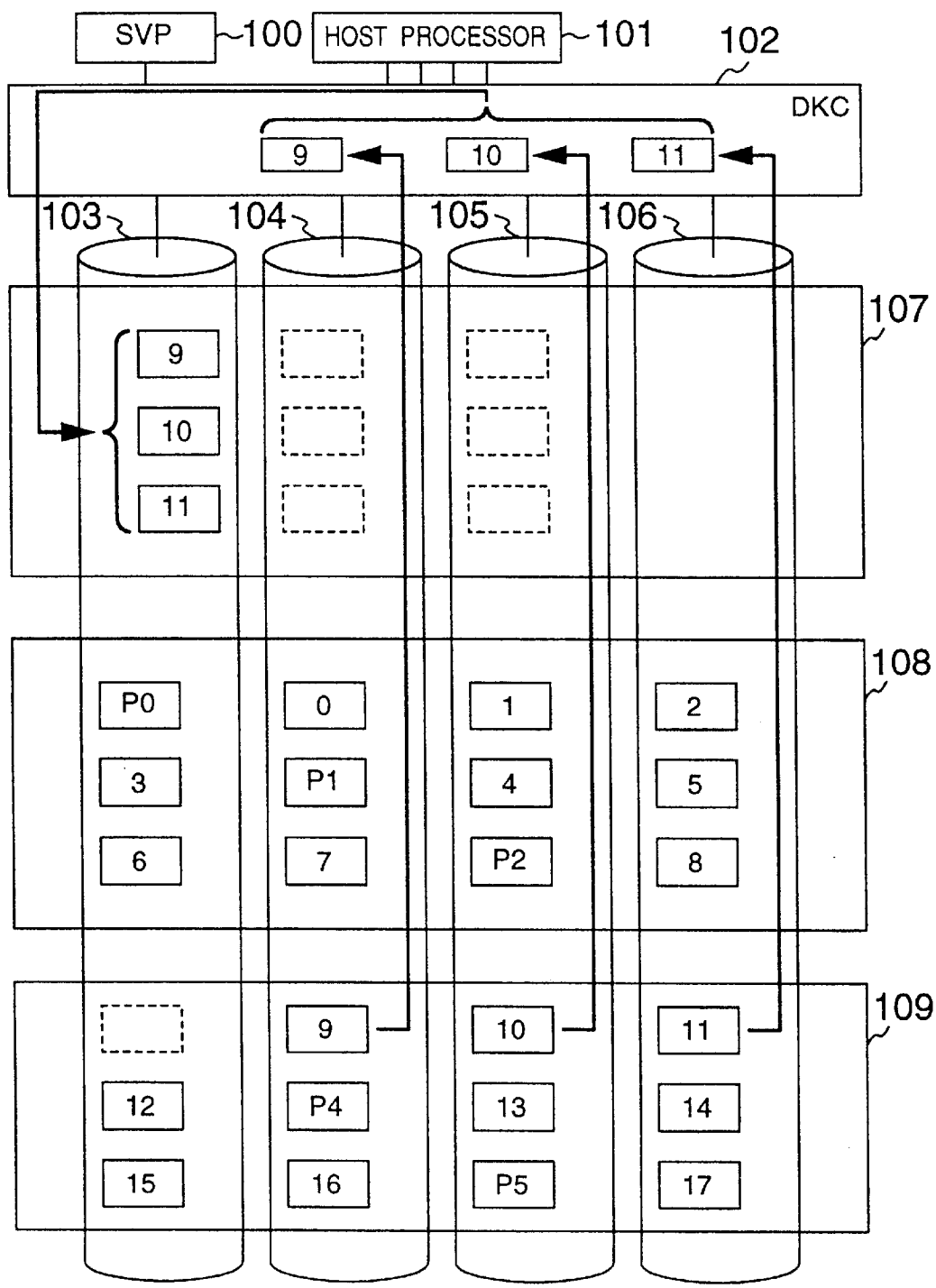
FIG. 5 is a diagram showing a process for changing the redundancy method from parity to mirror in a disk array subsystem according to the present invention.

FIG. 5 shows a process by which the DKC 102 changes the redundancy technique to improve the accessibility and availability of data in the parity data area B 109. First, the DXC 102 reads the data from the parity data area B 109, and then copies the data read into the mirror data area 107 for duplicating. As the last step, the DXC 102 invalidates the parity storing areas in the parity data area B 109. FIG. 5 shows an example in which the DKC 102 copies some of the data with respect to the drive 103 for duplicating.

In the first step, the DKC 102 reads the data 15 blocks 9, 10 and 11 from the parity data areas B 109 of the drives 104, 105 and 106.

In the second step, the DKC 102 copies the data blocks 9, 10 and 11 into the mirror data area 107 of the drive 103.

In the third step, the DKC 102 invalidates the parity storing area within the parity data area B 109 of the drive 103.

Figure 6:
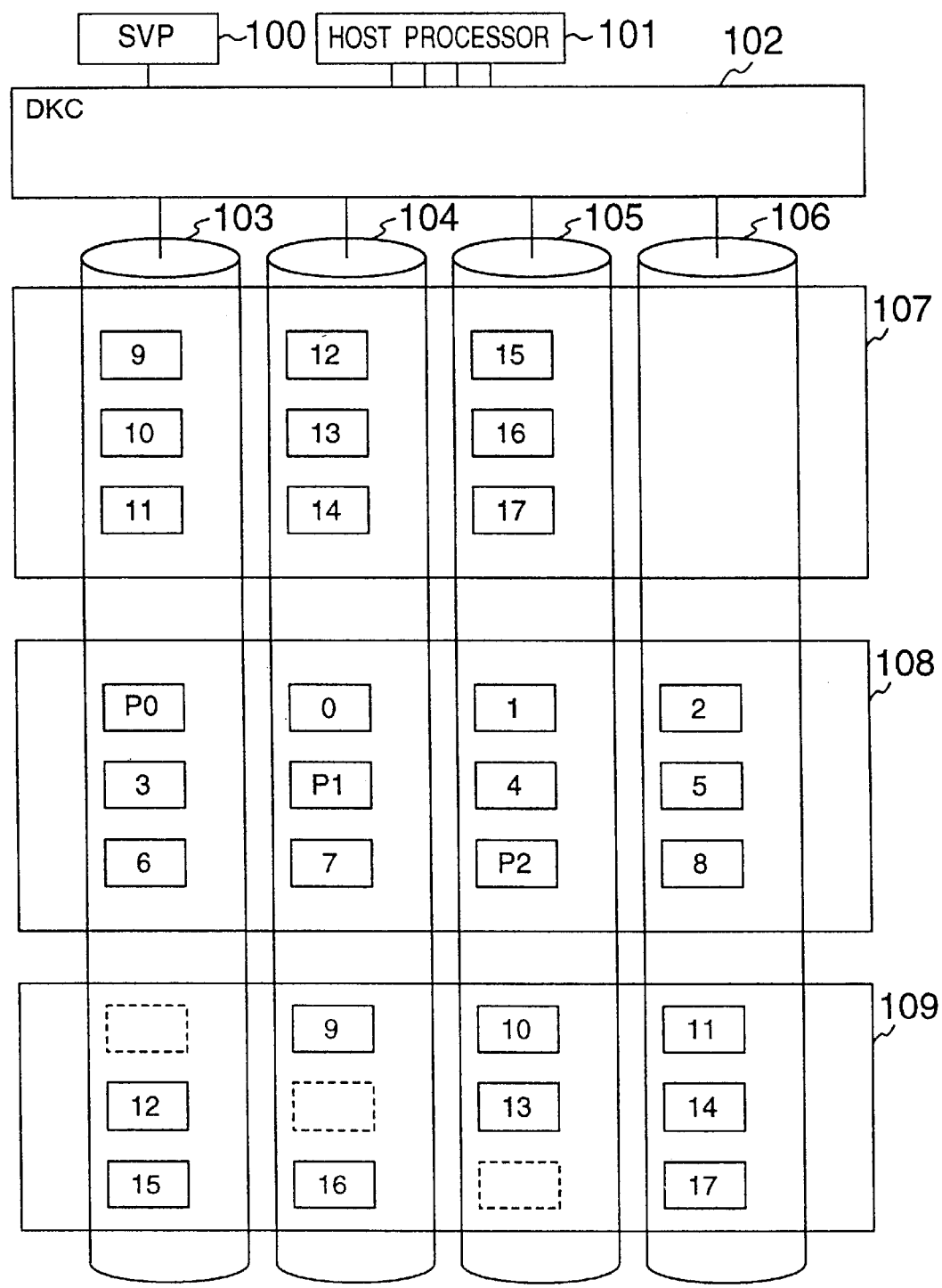
FIG. 6 is a diagram showing data arrangement after change of the redundancy method from parity to mirror has been completed in a disk array subsystem according to the present invention.

The DKC 102 repeats the first to third steps for the rest of the drives 104, 105 and 106 so that The data in these drives are copied to the mirror data area 107. As a result, the data in the parity data area B 109 have been duplicated. FIG. 6 shows data arrangement in the disk array subsystem after the change. Particularly, FIG. 6 shows the arrangement of data in drives 103–106 and data areas 107–109 as a result of the redundant processing performed as per FIG. 5.

The conventional disk array subsystem required, when changing the redundancy method from parity to mirror, that the DXC 102 further copy the data blocks into the mirror data area of another drive after the second step. Unlike such conventional subsystem, the disk array subsystem according to the present invention can dispense with the step of copying the data blocks from one mirror data area to another since the data blocks in the parity data area themselves are used as one group of the duplicated data. The conventional disk array subsystem required that five drives be exclusively used and that three times of reading and two times of writing be made to change the redundancy method from parity to mirror. However, the disk array subsystem according to the present invention can change the data redundancy means for the data blocks 9, 10 and 11 from parity to mirror by requiring that four drives be used and that three times of reading and a single time of writing be made as shown in FIG. 5. As a result, the subsystem according to the present invention can reduce the utilization rate of its drives and thus prevent degradation of its performance when it changes the redundancy method.

While the mirror data area 107, and the parity data areas A108 and B109 are allocated to a same group of drives such as the drives 103 to 106 in this embodiment, each of these areas can be allocated to different groups of drives as well.

Further, the size of the data block and the parity block is equal to the capacity of a single track of a drive in this embodiment. It is apparent, however, that similar advantages can be obtained by setting their size equal to a desired capacity such as the capacity of a single cylinder or any capacity smaller than a single track.

Still further, the redundancy method can be changed when at least one of the following three events is established in this embodiment.

(1) When a maintenance person transmits a redundancy method changing command to the DKC 102 from the SVP 100.

(2) When the operating system or an application program on the host processor 101 transmits the redundancy method changing command to the DKC 102.

(3) When the DKC 102, having the function of gathering information about the frequency of accesses to the drives 103 to 106, finds that the frequency is over or below a predetermined threshold.

Figure 7:
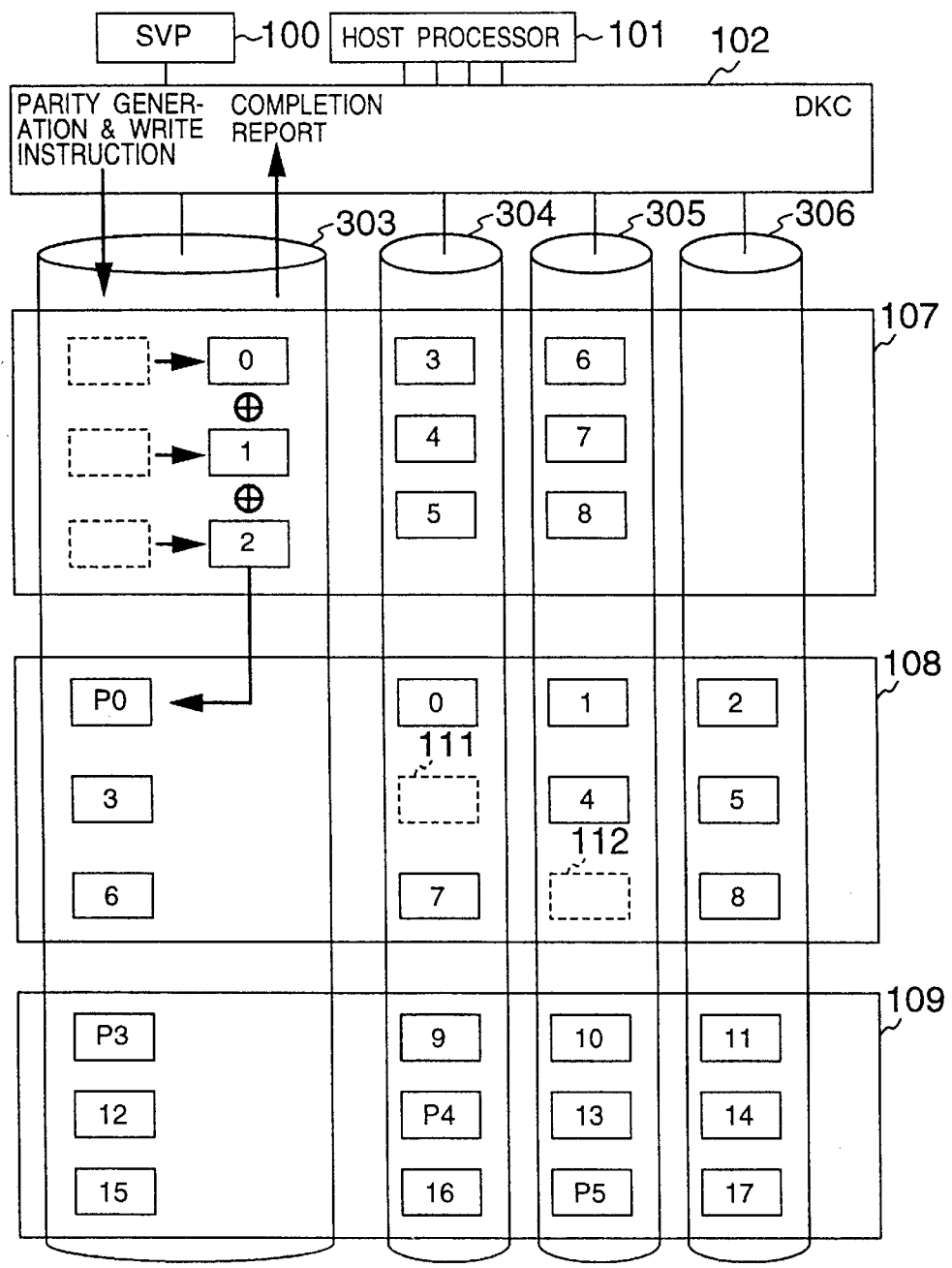
FIG. 7 is a diagram showing a configuration of a second embodiment of the present invention.

FIG. 7 shows a configuration according to a second embodiment of the present invention. Since a disk array subsystem of this embodiment is identical in its basic configuration and operation to the subsystem of the first embodiment 1, the following describes the subsystem of the second embodiment only as distinguished from that of the first embodiment. The subsystem of this embodiment is different from the subsystem of the first embodiment in that each of drives 303 to 306 has a parity block generating function. FIG. 7 shows a process in which data redundancy means for data blocks 0, 1 and 2 are changed from mirror to parity.

In the first step, the DKC 102 instructs the drive 303 to generate a parity block P0 from the data blocks 0, 1 and 2 and write the generated parity block P0 into a predetermined position.

In the second step, the drive 303 generates 10 the parity block P0 and writes the generated parity block P0 as instructed by the DKC 102.

In the third step, the drive 303 informs the DKC 102 that the generation and writing of the parity block P0 has been finished.

Between the first step and the third step, the DKC 102 can control the other drives 304 to 306 or transmit and receive commands to and from the host processor 101. Thus, this embodiment reduces the processing overhead of the DKC 102 by allowing each drive to generate and write a parity block only within itself. As a result, this embodiment can improve the performance of the disk array subsystem further than the first embodiment.

Figure 8:
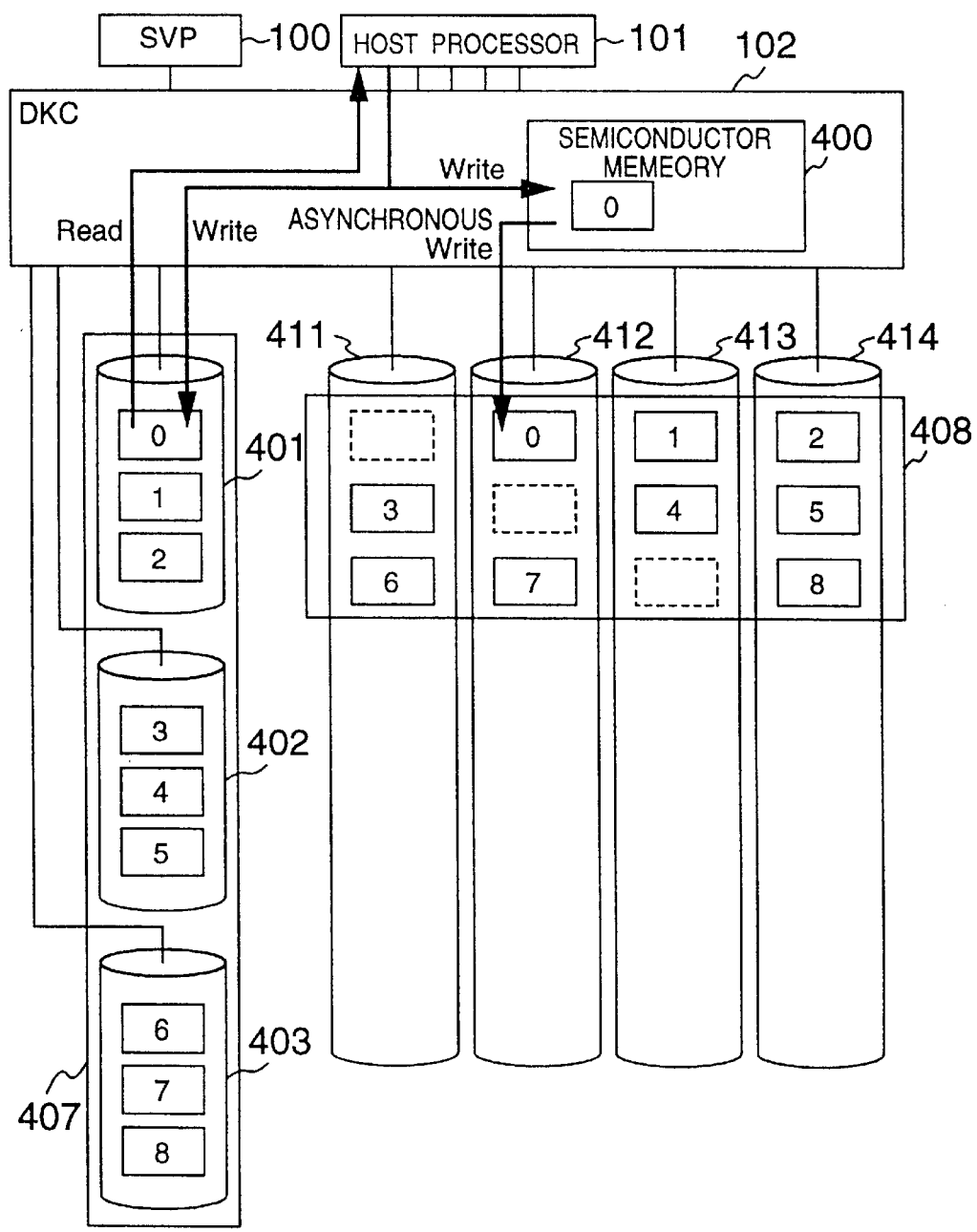
FIG. 8 is a diagram showing a configuration of a third embodiment of the present invention.

FIG. 8 shows a configuration according to a third embodiment. A disk array subsystem of this embodiment is identical in its basic configuration and operation to the subsystem of the first embodiment, and the following describes the subsystem of this embodiment only as distinguished from that of the first embodiment. What distinguishes this embodiment from the first embodiment is as follows.

(1) A mirror data area 407 is allocated to drives 401, 402 and 403 that are different drives from those having a parity data area 408.

(2) Each of the drives 401, 402 and 403 to which the mirror data area 407 is allocated is smaller in capacity but processes data at a higher speed than drives 411 to 414 to which the parity data area 408 is allocated.

(3) A semiconductor memory 400 for temporarily storing data to be written to the drives 411 to 414 is provided within the DKC 102.

As a result of such configuration, this embodiment can reduce read/write time compared with the subsystem of the first embodiment. The following accounts in detail for why this can be implemented.

For read operation, data blocks are read from the mirror data area 407. Since the mirror data area 407 is allocated to the high-speed drives 401, 402 and 403 in this embodiment, the read time can be shortened.

For write operation, data blocks are written to both the mirror data area 407 and the semiconductor memory 400 to duplicate the data blocks. At this point of time in the process, the DXC 102 informs a host processor 101 that the write operation has finished.

The writing of the data blocks into the parity data area 408 is effected synchronously after the write operation has been finished. Therefore, the time required for writing the data blocks into the parity data area 408 is not counted in the write time. The write time includes only the time required for writing the data blocks into the mirror data area 407. Since the mirror data area 407 is provided in the high-speed drives 401, 402 and 403, the write time can be shortened.

According to the present invention, the disk array subsystems with the redundancy method changing function can reduce the frequency of accesses to magnetic disk drives required to change the redundancy method, compared with the conventional redundancy method changing techniques. Especially, the present invention can change the redundancy method from duplicating to parity without involving transfer of data, and this prevents the disk array subsystems from impairing their performance when the subsystems change their redundancy methods.

What is claimed is:

1. A disk array subsystem comprising:
   a plurality of drives for storing data; and
   a controller for controlling said drives and allocating a plurality of storage areas to said drives,
      wherein when implementing redundancy by recording or writing same data in said storage areas, said controller allocates a first storage area to at least one of said storage areas such that a plurality of data blocks and a parity block for storing parity data generated from said data blocks are distributed over said drives in said at least one storage area.

2. The disk array subsystem according to claim 1, wherein when changing from implementing redundancy by recording or writing same data in said storage areas to implementing redundancy by distributing a plurality of data blocks and a parity block for storing parity data generated from said data blocks over said drives in said at least one storage area, said controller stores parity data generated from said plurality of data blocks in said parity block in said first storage area and distributes said parity block and said data blocks over said drives in said first storage area, thereby implementing redundancy while deleting data in other storage areas in which the same data are stored.

3. The disk array subsystem according to claim 2, wherein data blocks that are used for generating the parity data to be stored in said parity block in said first storage area have been stored in the same drive in said other storage areas as one in which said parity block is provided in said first storage area.

4. The disk array subsystem according to claim 3, wherein said controller generates parity data to be stored in said parity block in said first storage area from data stored in the same drive in said other storage areas as one in which said parity block in said first storage area is provided.

5. The disk array system according to claim 4, wherein the drive which has said parity block in said first storage area generates parity data to be stored in said parity block from data stored in said other storage areas in said drive.

6. A disk array subsystem having:
   a plurality of drives for storing data; and
   a controller for controlling said drives and allocating a plurality of storage areas to said drives,
      wherein said disk array subsystem involves two kinds of data, a first kind of data being data going through redundancy processing by which said data is stored in said storage areas, while a second kind of data going through different redundancy processing by which a plurality of data and parity data generated from said data are stored in said plurality of drives in a storage area,
      wherein a first storage area, which is one of said storage areas which are for storing same data for redundancy purposes, has a block for storing parity data generated from a plurality of blocks of data, and
      wherein when said controller changes a method of executing redundancy processing from a method of storing same data in a plurality of storage areas to a method of storing a plurality of data and parity data generated therefrom in said drives in a storage area, said controller uses said first storage area as a storage area for executing the redundancy processing based on parity data.

7. The disk array subsystem according to claim 6, wherein the method executing redundancy processing by storing same data in a plurality of storage areas is RAID 1, while the method of executing redundancy processing by storing a plurality of data and parity data generated from said data in said drives in a storage area is RAID 5.

8. The disk array subsystem according to claim 6, wherein when said controller changes the method of executing redundancy processing from a method of storing same data in a plurality of storage areas to a method of storing a plurality of data and parity data generated therefrom in said drives in a storage area, said controller generates said parity data from said plurality of data, stores the generated data in said parity block, and deletes data in other storage areas which have stored therein the same data as that stored in said first storage area.

9. The disk array subsystem according to claim 8, wherein those data blocks that are used for generating the parity data to be stored in said parity block in said first storage area have been stored in the same drive in said other storage areas as one in which the same drive in said other storage areas as one in which said parity block is provided in said first storage area.

10. The disk array subsystem according to claim 9, wherein said controller generates parity data to be stored in said parity block in said first storage area from data stored in the same drive in said other storage areas as one in which said parity block in said first storage area is provided.

11. The disk array subsystem according to claim 9, wherein the drive which has said parity block in said first storage area generates parity data to be stored in said parity block from data stored in said other storage areas in said drive.

12. The disk array subsystem according to claim 6, wherein said controller changes the method of executing redundancy processing based on an instruction from a host apparatus to be connected to said controller.

13. The disk array subsystem according to claim 6, wherein said controller changes the method of executing redundancy processing based on access frequency information given by a host apparatus to be connected to said controller.

14. A disk array subsystem having:
 a plurality of drives for storing data;
 a controller for controlling said plurality of drives and allocating a plurality of storage areas to the plurality of drives,
  wherein said subsystem involves two kinds of data, a first kind of data being data which goes through redundancy processing by which same data are stored in said storage areas, while a second kind of data being data which goes through redundancy processing by which a plurality of data and parity data generated from said plurality of data are stored in said drives in a storage area,
 wherein of first and second storage areas for storing same data for redundancy purpose, the first storage area has a block for storing parity data generated from a plurality of blocks of data, and
 wherein when said controller changes a method of executing redundancy processing from a method of storing same data in a plurality of storage areas to a method of storing a plurality of drives in a storage area, said controller uses said first storage area as a storage area for executing the redundancy processing based on parity data.

15. The disk array subsystem according to claim 14, wherein the method of redundancy processing by storing same data in a plurality of storage areas is RAID 1, while the method of redundancy processing method by storing a plurality of data and parity data generated from said plurality of data in said plurality of drives in a storage area is RAID 5.

16. The disk array subsystem according to claim 14, wherein when said controller changes the method of executing redundancy processing from the method of storing same data in a plurality of storage areas to the method of storing same data in a plurality of storage areas to the method of storing a plurality of data and parity data generated therefrom in said plurality of drives in a storage area, said controller generates said parity data from said plurality of data, stores the generated said parity data in said parity block, and deletes data in said second storage area which has stored therein the same data as that stored in said first storage area.

17. The disk array subsystem according to claim 16, wherein those data blocks that are used for generating the parity data to be stored in said parity block in said first storage area have been stored in the same drive in said second storage areas as one in which said parity block is provided in said first storage area.

18. The disk array subsystem according to claim 17, wherein said controller generates parity data to be stored in said parity block in said first storage area from data stored in the same drive in said second storage area as one in which said parity block in said first storage area is provided.

19. The disk array subsystem according to claim 17 wherein the drive which has said parity block in said first storage area generates parity data to be stored in said parity block from data stored in said second storage area in said drive.

20. The disk array subsystem according to claim 14, wherein said controller changes the method of executing redundancy processing based on an instruction from a host apparatus to be connected to said controller.

21. The disk array subsystem according to claim 14, wherein said controller changes the method of executing redundancy processing based on an instruction given by a service processor to be connected to said controller.

22. The disk array subsystem according to claim 14, wherein said controller changes the method of executing redundancy processing based on access frequency information given by a host apparatus to be connected to said controller.

* * * * *